(12) United States Patent
Dekoker et al.

(10) Patent No.: US 12,298,979 B2
(45) Date of Patent: May 13, 2025

(54) PROCESSING LOGIC RULES IN A SPARQL QUERY ENGINE

(71) Applicant: DASSAULT SYSTEMES, Vélizy-Villacoublay (FR)

(72) Inventors: Sylvain Christian Dekoker, Vélizy-Villacoublay (FR); Frédéric Matteo Labbate, Vélizy-Villacoublay (FR); Eric Laurent Vallet Glénisson, Vélizy-Villacoublay (FR); Jean-Philippe Louis Marie Sahut D'Izarn, Vélizy-Villacoublay (FR)

(73) Assignee: DASSAULT SYSTEMES, Vélizy-Villacoublay (FR)

( * ) Notice: Subject to any disclaimer, the term of this patent is extended or adjusted under 35 U.S.C. 154(b) by 0 days.

(21) Appl. No.: 18/079,554

(22) Filed: Dec. 12, 2022

(65) Prior Publication Data

US 2023/0185810 A1 Jun. 15, 2023

(30) Foreign Application Priority Data

Dec. 12, 2021 (EP) ..................................... 21306752

(51) Int. Cl.
*G06F 16/2455* (2019.01)
*G06F 16/901* (2019.01)

(52) U.S. Cl.
CPC .... *G06F 16/24566* (2019.01); *G06F 16/9024* (2019.01)

(58) Field of Classification Search
CPC ........... G06F 16/24566; G06F 16/9024; G06F 16/24564; G06N 5/01; G06N 5/022; G06N 5/042; G06N 5/046
See application file for complete search history.

(56) References Cited

U.S. PATENT DOCUMENTS

2006/0235823 A1* 10/2006 Chong ................ G06F 16/2455
2011/0119310 A1 5/2011 Kolovski et al.
(Continued)

OTHER PUBLICATIONS

Sen S, Katoriya D, Dutta A, Dutta B. RDFM: An alternative approach for representing, storing, and maintaining meta-knowledge in web of data. Expert Systems with Applications. Oct. 1, 2021;179:115043. (Year: 2021).*

(Continued)

*Primary Examiner* — Dennis Truong
(74) *Attorney, Agent, or Firm* — Oblon, McClelland, Maier & Neustadt, L.L.P.

(57) ABSTRACT

A computer-implemented method for processing a logic rule in a graph database. The method includes obtaining a graph database comprising at least one graph, each graph of the database being represented in one or more adjacency matrices (R-Matrix), each adjacency matrix representing a group of tuples of the graph comprising a same predicate, obtaining the logic rule concluding to a head predicate, generating a virtual adjacency matrix comprising one of the one or more adjacency matrices (R-Matrix) and an entailed data matrix (E-Matrix), the virtual adjacency matrix representing the head predicate, the entailed data matrix representing a group of tuples that are computed by applying the logic rule, and receiving a query by the database using the head predicate.

20 Claims, 5 Drawing Sheets

(56) References Cited

U.S. PATENT DOCUMENTS

| | | | | |
|---|---|---|---|---|
| 2011/0320187 | A1* | 12/2011 | Motik | G06F 16/3344 704/9 |
| 2014/0156633 | A1* | 6/2014 | Duan | G06F 16/9024 707/713 |
| 2014/0244657 | A1* | 8/2014 | Mizell | G06F 16/2228 707/743 |
| 2016/0224637 | A1* | 8/2016 | Sukumar | G06F 16/2465 |
| 2019/0391791 | A1* | 12/2019 | Bebee | G06F 8/71 |
| 2021/0240917 | A1* | 8/2021 | Sen | G06F 40/16 |
| 2022/0121816 | A1* | 4/2022 | Seul | G06N 5/022 |

OTHER PUBLICATIONS

Ali, Waqas, et al. "A survey of RDF stores & SPARQL engines for querying knowledge graphs." The VLDB Journal (2022): 1-26. (Year: 2022).*

Z. Zheng, Y. Ding, Z. Wang and Z. Wang, "A Novel Method of Keyword Query for RDF Data Based on Bipartite Graph, " 2016 IEEE 22nd International Conference on Parallel and Distributed Systems (ICPADS), Wuhan, China, 2016, pp. 466-473 (Year: 2016).*

Zhuoran Ji and Cho-Li Wang. 2021. Accelerating DBSCAN Algorithm with AI Chips for Large Datasets. In Proceedings of the 50th International Conference on Parallel Processing (ICPP '21). Association for Computing Machinery, New York, NY, USA, Article 51, 1â11 (Year: 2021).*

Lei Zou, Jinghui Mo, Lei Chen, M. Tamer Azsu, and Dongyan Zhao. 2011. GStore: answering SPARQL queries via subgraph matching. Proc. VLDB Endow. 4, 8 (May 2011), 482â493. (Year: 2011).*

Extended European Search Report issued May 9, 2022, in European Patent Application No. 21306752.3 filed Dec. 12, 2021, citing document Nos. 1 and 21-22, therein 11 pages.

Abiteboul, S., et al., "Foundations of Databases", Reading: Addison-Wesley, 1995, 702 total pages.

Gandon, F., et al., The Resource Description Framework and its Schema, Handbook of Semantic Web Technologies, 2011, 978-3-540-92912-3, 50 total pages.

Hellerstein, J.M., et al., "Readings in Database Systems", Third Edition, Morgan Kaufmann, Mar. 1998, 7 total pages.

Green, T., et al., "Datalog and Recursive Query Processing", Now Publishers, 2013, 94 total pages.

RDF 1.1 Semantics, W3C Recommendation Feb. 25, 2014, 1 total page.

Harris, S., et al., "3store: Efficient Bulk RDF Storage", 2003, 15 total pages.

Abadi, D., et al., "Scalable Semantic Web Data Management Using Vertical Partitioning", In: Proceedings of the 33rd International Conference on Very Large Data Bases, 2007, pp. 411-422.

"SPARQL 1.1 Query Language", W3C Recommendation Mar. 21, 2013, online, 1 total page.

Álvarez-García, S., et al., "Compressed Vertical Partitioning for Efficient RDF Management", Knowledge and Information Systems, 2015, vol. 44, No. 2, p. 439-474, 38 total pages.

Kaoudi, Z., et al., "RDF in the clouds: a survey", VLDB Journal, Springer Verlag, Berlin, DE, vol. 24, No. 1, Feb. 1, 2015 (Feb. 1, 2015), pp. 67-91, XP058066104, ISSN: 1066-8888, DOI: 10.1007/S00778-014-0364-Z * the whole document*.

Jamour, F., et al., "Matrix Algebra Framework for Portable, Scalable and Efficient Query Engines for RDF Graphs", Mar. 25, 2019; 1077952576-1077952576, Mar. 25, 2019 (Mar. 25, 2019), pp. 1-15, XP058428805, DOI: 10.1145/3302424.3303962 ISBN: 978-1-4503-6281-8 * the whole document*.

* cited by examiner

RDFS entailment patterns.

| | If S contains: | then S RDFS entails recognizing D: |
|---|---|---|
| rdfs9 | xxx rdfs:subClassOf yyy .<br>zzz rdf:type xxx . | zzz rdf:type yyy . |

*Initialization*
reachable$^{[0]}$ := ∅
δ(reachable)$^{[0]}$ := {(a,b),(b,c),(c,d),(c,c)}

*Iteration 1:*
reachable$^{[1]}$ := {(a,b),(b,c),(c,d),(c,c)}
Δ(reachable)$^{[1]}$ := {(a,c),(b,d),(b,c),(c,c)}
δ(reachable)$^{[1]}$ := {(a,c),(b,d)}

*Iteration 2:*
reachable$^{[2]}$ := {(a,b),(b,c),(c,d),(c,c),(a,c),(b,d)}
Δ(reachable)$^{[2]}$ := {(a,d)}
δ(reachable)$^{[2]}$ := {(a,d)}

*Iteration 3:*
reachable$^{[3]}$ := {(a,b),(b,c),(c,d),(c,c),(a,c),(b,d),(a,d)}
Δ(reachable)$^{[3]}$ := ∅
δ(reachable)$^{[3]}$ := ∅

PROCESSING LOGIC RULES IN A SPARQL QUERY ENGINE

CROSS REFERENCE TO RELATED APPLICATIONS

This application claims priority under 35 U.S.C. § 119 or 365 to European Application No. 21306752.3, filed Dec. 12, 2021. The entire contents of the above application are incorporated herein by reference.

TECHNICAL FIELD

The disclosure relates to the field of computer programs and systems, and more specifically to a method, system, and program for processing a logic rule in a graph database.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the techniques. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production, and service.

Graph databases are particularly adapted for interactive applications with the database such as many of "creative authoring applications", e.g., in CAD software. Such applications are often realized in In-memory databases, i.e., purpose-built databases that rely primarily on memory for data storage, in contrast to databases that store data on disk or SSDs It is further useful to do some reasoning on knowledge represented and/or stored in form of graphs, i.e., to infer new facts from existing facts. Such reasoning deduces new information by applying logic rules on the knowledge base represented as graphs by an inference engine. The inference process may further iterate on the new fact in the knowledge base to trigger additional rules in the inference engine. Inference engines are made to handle automatic management of knowledge rules. Using knowledge rules make the design of a system more intelligible by enabling to factorize (i.e., compress) some of information stored in a graph so that is no longer needed to repeat that information. The factorized information is no longer explicitly represented in the graph but can be derived through inference.

In the field of databases, foundations of database theory are based on the first order logic. First order logic composes the relational calculus (and then SQL) but without recursion. In the late 90's, database research drifted away from recursive queries because of high performance cost. Documents Abiteboul et al., "*Foundations of databases*", Vol. 8. Reading: Addison-Wesley, 1995, and Green et al., "*Datalog and recursive query processing*", Now Publishers, 2013, discuss research with Datalog as an attempt to add recursion to the positive (i.e., without negation) part of the relational calculus.

In recent years, recursive queries in a variety of application domains such as data integration and exchange, information extraction, networking, and program analysis, are widely emerging. Nevertheless, these methods are complex at the query level, hard to implement, costly in performance, or need a dedicated query engine.

Within this context, there is still a need for an improved method for processing a logic rule in a graph database.

SUMMARY

It is therefore provided a computer-implemented method for processing a logic rule in a graph database. The method comprises:
 providing a graph database comprising at least one graph, each graph of the database being represented in one or more adjacency matrices (R-Matrix), each adjacency matrix representing a group of tuples of the graph comprising a same predicate;
 providing the logic rule concluding to a head predicate;
 generating a virtual adjacency matrix comprising one of the one or more adjacency matrices (R-Matrix) and an entailed data matrix (E-Matrix), the virtual adjacency matrix representing the head predicate, wherein the entailed data matrix represents a group of tuples that are computed by applying the logic rule; and
 receiving a query by the database using the head predicate.

The method may comprise one or more of the following:
 the virtual adjacency matrix further comprises an update processor, the update processor being configured to update the entailed data matrix when the head predicate is modified;
 the logic rule comprises a set of one or more logic rules each being at most a first order logic rule;
 the logic rule is expressed as a linear recursive query;
 the generation of the entailed data matrix comprises a forward chaining technique;
 the group of tuples of the graph represented by a respective adjacency matrix are non-inferred tuples;
 the graph database is an RDF graph database, each tuple being an RDF triple comprising a subject, a predicate and an object; or an RDF quad comprising subject, a predicate, an object and a graph name;
 the provided logic rule is an RDFS rule;
 the provided logic rule is a default attribute rule configured to return a default value for an object or a subject of at least one RDF tuple;
 the receiving a query by the database using the head predicate comprises receiving a query by an SPARQL query engine;
 answering the received query by an SPARQL query engine.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
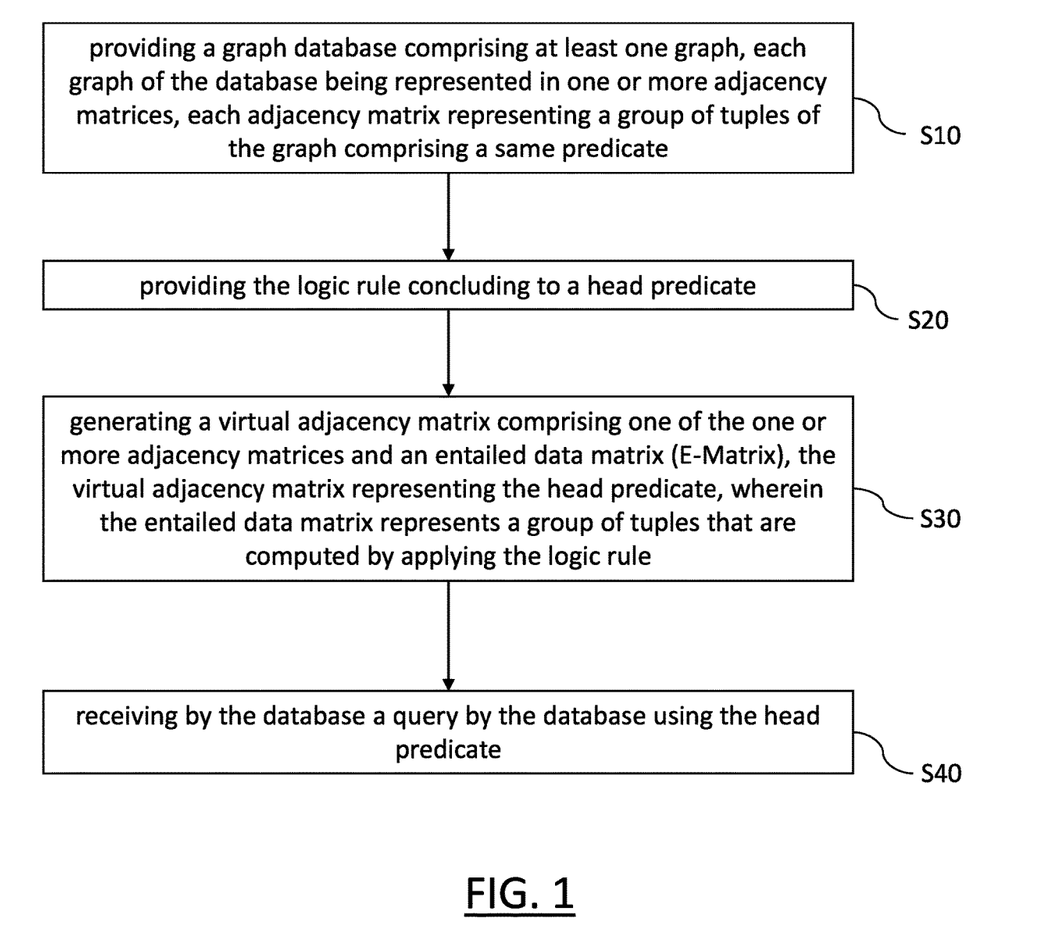
FIG. 1 shows a flowchart of an example of the method.

With reference to the flowchart of FIG. 1, it is described a computer-implemented method for processing a logic rule in a graph database. The method comprises providing S10 a graph database comprising at least one graph, each graph of the database being represented in one or more adjacency matrices (also noted R-Matrices). Each adjacency matrix represents a group of tuples of the graph comprising a same predicate. The method further comprises providing S20 the logic rule concluding to a head predicate and generating S30 a virtual adjacency matrix comprising one (i.e., a R-Matrix) of the one or more adjacency matrices and an entailed data matrix (or E-Matrix). The virtual adjacency matrix represents the head predicate. The entailed data matrix represents a group of tuples that are computed by applying the logic rule. The method further comprises receiving S40 a query by the database using the head predicate.

Such a method constitutes an improved solution in processing a logic rule in a graph space by considering the R-matrices which represent the database and E-Matrices which represent a group of tuples being computed by applying the logic rule. In other words, the method improves the processing by separating parts of required information which are already available in form of adjacency matrices of a database, and the information need to be computed and updated at inference process by applying the logic rule. Therefore, a query engine on the database is able to use the virtual adjacency matrix as a standard adjacency matrix to answer the query and without even knowing that logic rule without adding added complexity. The method is further beneficial as it is able to use custom logic rules to use to infer knowledge from the database, in addition to well-known rules, for example RDFS (i.e., RDF Schema) rules defined based on semantics set by World Wide Web Consortium (W3C). The rules are presented in RDF 1.1 Semantics, W3C recommendation of 25 Feb. 2014 (or additionally the draft version RDF-star). As known per se, RDFS is a set of classes with certain properties using the RDF extensible knowledge representation data model, providing basic elements for the description of ontologies.

Notably, the method optimizes the processing of logic rules expressed as linear recursive queries in a SPARQL query engine with respect to calculation time of the processing, without adding high complexity for implementation in the query engine.

By "database", it is meant any collection of data (i.e., information) organized for search and retrieval (e.g., a graph-oriented database). As known in the art, a graph-oriented database is an object-oriented database using graph theory, therefore with vertices (i.e., nodes) and edges (i.e., arcs), allowing data to be represented and stored. The graph relates the data items in the store to a collection of vertices and edges, the edges representing the relationships between the nodes. The relationships allow data in the store to be linked together directly and, in many cases, retrieved with one operation. Graph databases hold the relationships between data as a priority; contrarily to other database models (e.g., relational databases) that link the data by implicit connections. When stored on a memory, the graph database allows a rapid search and retrieval by a computer. Especially, graph databases are structured to for fast retrieval, modification, and deletion of relationships in conjunction with various data-processing operations. Graph-oriented database are also referred to as graph database; the expressions "graph-oriented database" and "graph database" are synonymous.

In examples, the graph database may be an RDF graph database. RDF graphs are a traditional data model used for the storage and the retrieving of graphs. RDF graph is a directed, labeled graph data format. Such format is widely used for representing information in the Web. A standard specification has been published by W3C to specify RDF representation of information as graphs, see for example "RDF 1.1 Concepts and Abstract Syntax", W3C Recommendation 25 Feb. 2014. The core structure of the abstract syntax used is a set of tuples, each comprising a predicate. A set of such RDF tuples is called an RDF graph. In examples, an RDF tuple may comprise three or four elements comprising nodes and edges. In examples, each RDF tuple (or elements of each RDF tuple) may be a triple comprising a subject, a predicate and an object. In such examples, an RDF graph may be visualized as a node and a directed, labelled graph, in which each triple is represented as a node-arc-node link. Alternatively, an RDF triple may be visualized by two nodes, which are the subject and the object and an arc connecting them, which is the predicate. In examples, the RDF tuple may be an RDF quad. A standard specification has been published by W3C to specify RDF Quads (also referred to as N-Quads), see for example "RDF 1.1 N-Quads, A line-based syntax for RDF datasets", W3C Recommendation 25 Feb. 2014. As RDF quad may be obtained by adding a graph name to an RDF triple. A graph name may be either empty (i.e., for a default or unnamed graph) or an IRI (e.g., a predicate). The graph name of each quad is the graph that the quad is part of in the dataset. Hereinafter, the term RDF tuple (or tuple) indifferently refers to an RDF triple or an RDF quad, unless the use of one or the other is explicitly mentioned.

An RDF graph database may have billions of tuples; for example the Uniprot dataset is a resource of protein sequence and functional information.

By a "logic rule" (which may be equivalently referred to as an "inference rule" or a "knowledge rule") it is meant a deductive mechanism that states its conclusion (equivalently called "head" of the rule) to be true when its premises (equivalently called body of the rule) are true. The head of a logic rule is a predicate which is equivalently referred to as "head predicate". In other words, the head predicate defines an output of interest of a corresponding query on the database. By "processing a logic rule in a graph database" it is meant an application of the logic rule to graphs stored in the database in order to infer new information.

In reference to FIG. 1, in step S10, the method comprises providing a graph database comprising at least one graph. By "providing a graph database" it means obtaining a graph database. The computer system can therefore perform read and/or write and/or execute operations on the obtained graph database. Obtaining a graph database may be retrieving a graph database from a remote or local memory, persistent or non-persistent memory. Each graph of the database is represented in one or more adjacency matrices (also referred to as R-Matrices). An adjacency matrix is a square matrix used to represent a finite graph. The elements of the matrix indicate whether pairs of vertices are adjacent or not in the graph. Thus, each adjacency matrix represents a group of tuples of the graph comprising a same predicate.

In examples, such group of tuples of the graph represented by a respective adjacency matrix may be non-inferred tuples, or (as equivalently called) ground tuple. The ground tuples are the tuples explicitly present (i.e., stored) in the database. In other words, each R-matrix (adjacency matrix) represents a group of tuples of the graph of the provided graph database which are not obtained by an inference (i.e., reasoning) on the database. The group of tuples of each R-Matrix comprises (i.e., sharing) a same predicate. In yet other words, the group of tuples groups (i.e., partitions) the provided graph database according to predicates of the graph. Such a partitioning is beneficial as the variability of predicates is low in graph databases, for example in RDF graph databases, and in particular fits standard graph representations based on vertical partitioning (see, e.g., Abadi et al., "*Scalable semantic web data management using vertical partitioning*", In: Proceedings of the 33rd international conference on Very large data bases, 2007, pp. 411-422). Still in reference to FIG. 1, in step S20, the method further comprises providing the logic rule concluding to a head predicate. By "providing the logic rule" it is meant setting the logic rule for example by a user or importing the logic rule from a library (e.g., W3C Recommendations). By "the logic rule concluding to a head predicate" it is meant that the logic rule, upon its application to provided graph database, infers information, i.e., new graphs deducting information of the head predicate, i.e., the head of the provided logic rule. In other words, an application of the logic rule on graph data deduces (i.e., infers) new information in type of the head predicate. The head predicate may be also equivalently referred to as "distinguished query predicate" and is output of interest of the corresponding query of the head predicate.

In examples, the provided logic rule may comprise a set of one or more logic rules each being at most a first order logic rule. In other words, each provided logic rule may be rewritten as a set of one or more first order logic rules.

In examples, the provided logic rule is expressed as a linear recursive query, i.e., the head predicate appears only once in the body of the provided logic rule.

In examples, the provided logic rule is an RDFS rule. For example, a provided rule may be RDFS9 rule in W3C semantics, defined as the following Type(z,y)←Type(z,x),SubClassOf(x,y)

which reads as: the conclusion "Type(z,y)" (i.e., z is of type y) is true if the premises "Type(z,x)" (i.e., z is of type x), and "SubClassOf(x,y)" (i.e., class x is a subclass of y), are true. In the notation, the coma "," means logical AND. Such a rule is linear recursive as "Type" is in the head of the rule and in the body of the rule.

In examples, the provided logic rule may be a class with default attributes, or an evaluation of security rules. In particular, the provided logic rule may be a default attribute rule configured to return a default value for an object or a subject of at least one RDF tuple. The processing of logic rules expressed as linear recursive queries in a SPARQL query engine are as a result not restricted to RDFS rules.

Back to FIG. 1, in step S30, the method generates (computes) a virtual adjacency matrix comprising one of the one or more adjacency matrices and an entailed data matrix where the entailed data matrix or E-Matrix represents the head predicate. By "representing the head predicate" it is meant that the E-Matrix is to compute the conclusion, i.e., the head predicate, of the provided logic rule. In other words, each E-Matrix is computed corresponding to a conclusion of the logic rule. The E-Matrix represents a group of tuples that are computed by applying the logic rule. In other words, the E-Matrix represents results of inference on the graph database to infer new information, i.e., new tuples other than the ground tuples, by application of the provided logic rule. The virtual adjacency matrix represents the adjacency matrix of the distinguished query predicate, i.e., the output of interest.

In examples, the generation of the entailed data matrix may comprise a forward chaining technique. As known per se, the "forward chaining technique"—or equivalently bottom-up approach or semi-naïve algorithm—is a technique to derive new tuples from non-inferred tuples. Such a forward chaining technique may be performed by any known method. This improves the facility of the implementation of the method and the response time.

In examples of the generation of the entailed data matrix, the method may materialize the result of the query in the E-Matrix of the head predicate. In such examples, the generation of the entailed data matrix may be compared to computing a materialized view in relational databases. As known per se a "materialized view" is a database object that contains results of a query. Such a query may be any query using the head predicate.

In examples, the virtual adjacency matrix may further comprise an update processor. The update processor is configured to update the entailed data matrix when the head predicate is modified. By "modification of the head predicate" it is meant when a modification of the corresponding query of the head predicate. Such modifications of the head predicate are results of modifications on the predicates of the body of the rule, i.e., the head predicated is not modified directly (which results in modification of a R-Matrix). Such a modification is similar to the modification of EDBs (i.e., the extensional database predicates) corresponding to the source tables of the database that a materialized view is computed from for SQL database. In examples, the update processor of the virtual adjacency matrix updates the E-Matrix of the virtual adjacency matrix when the head predicate changes.

Back to FIG. 1, in step S40, the method further comprises receiving by the database a query by the database using the head predicate. In examples where the graph database is an RDF graph database, the receive query may be a SPARQL query. SPARQL is a query language for RDF data able to express queries across diverse data sources, whether the data is stored natively as RDF or viewed as RDF via middleware. SPARQL contains capabilities for querying required and optional graph patterns along with their conjunctions and disjunctions. SPARQL also supports aggregation, subqueries, negation, creating values by expressions, extensible value testing, and constraining queries by source RDF graph. The results of SPARQL queries may be result sets or RDF graphs. In examples, the receiving a query by the database using the head predicate receiving a query by an SPARQL query engine. The received query may be any of standard SPARQL queries.

In examples, the method may further comprise answering the received query by an SPARQL query engine.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI); the memory having recorded thereon a computer program comprising instructions for performing the method. The memory may also store a database. The memory is any hardware adapted for such storage, possibly comprising several physical distinct parts (e.g., one for the program, and possibly one for the database).

Figure 6:
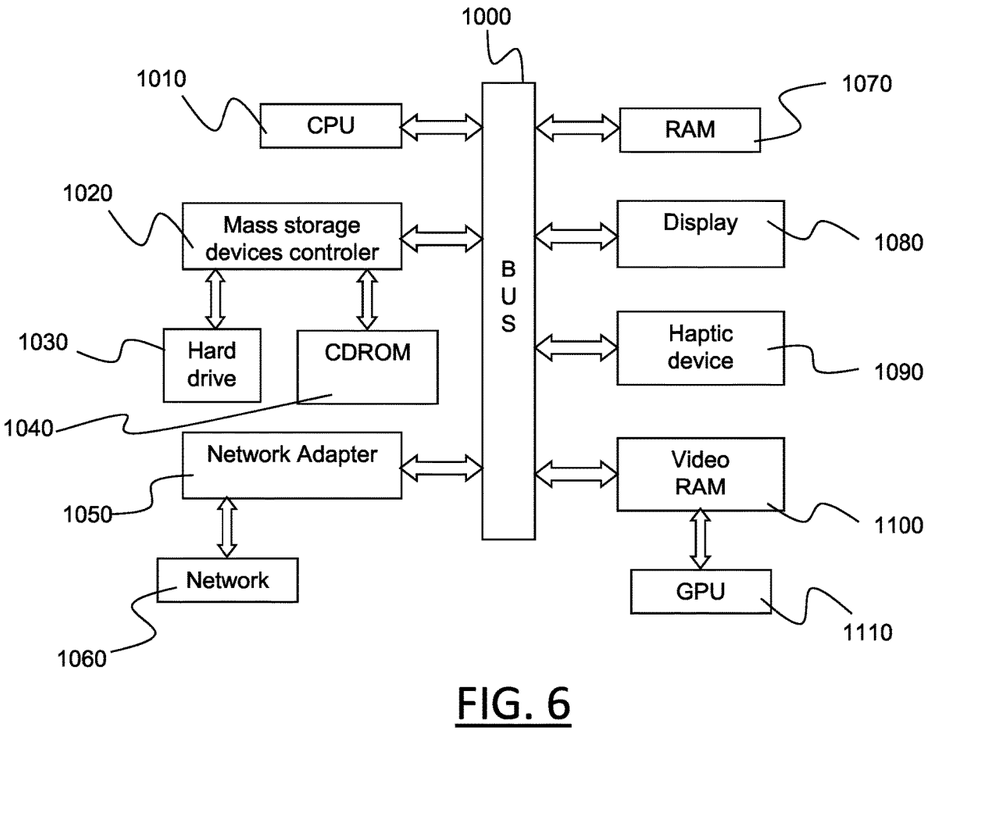
FIG. 6 shows an example of the system.

FIG. 6 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Examples of implementation of the hereinabove discussed examples of the method are now discussed.

The examples of implementations of the present disclosure process logic rules expressed as linear recursive queries in a SPARQL query engine. It is to be understood that the logic rules are not restricted to RDFS (RDF Schema) rules (e.g., the "default attribute" rule as discussed below).

The examples of implementations are further related to SPARQL querying. As previously mentioned, SPARQL is the W3C recommendation for querying RDF and is a graph-matching language built on top of triple patterns of RDF triples. The W3C specification defines the syntax and semantics of the SPARQL query language for RDF. SPARQL may be used to express queries across diverse data sources, whether the data is stored natively as RDF or viewed as RDF via middleware. SPARQL contains capabilities for querying required and optional graph patterns along with their conjunctions and disjunctions. SPARQL also supports aggregation, subqueries, negation, creating values by expressions, extensible value testing, and constraining queries by source RDF graph. The results of SPARQL queries can be result sets or RDF graphs.

Figure 2:
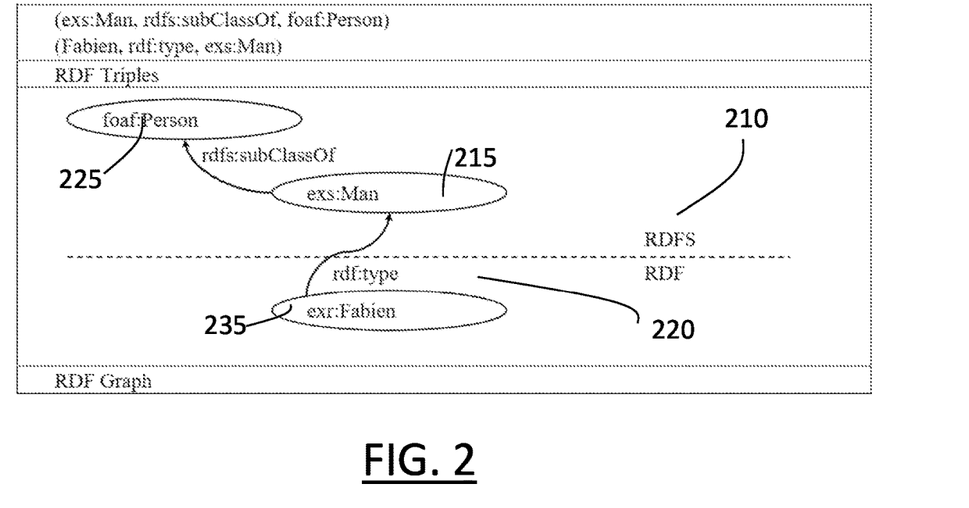
FIG. 2 shows an example of inference.

The examples of implementations are further related to reasoning on the knowledge in a database, i.e., to infer new facts from existing facts, using the logic rules. Such an inference may be performed using an RDFS inference, as presented in FIG. 2. In FIG. 2, the RDFS rule 210 says that class Man 215 (referring to a set of resources) is a subclass (subset) of class Person 225 (referring to another set of resources) while the RDF triple 220 says that Fabian 235 is (of type of) Man 240. Using the RDFS rule 210, there is no need to say the Fabian 235 is a Man 240 and a Person 225 as this fact can be derived (inferred) from the fact that Fabian 235 is a Man 240 and the fact that Man 240 is a subclass of Person 225, thus Fabian 235 is a Person 225. Thereby inference and RDFS rules removes the repetition in a database. Such rules can be seen as first order logic rules.

Figure 3:
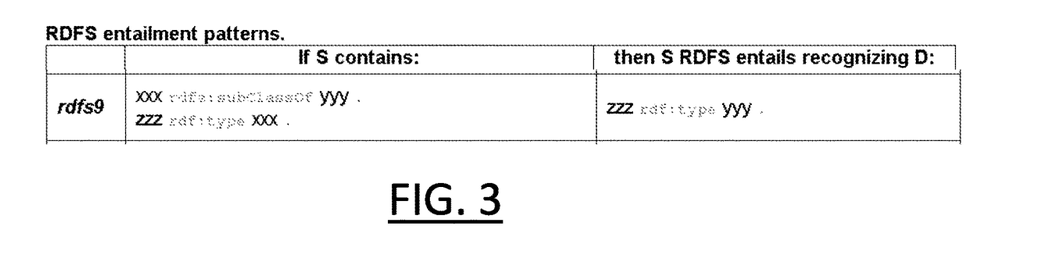
FIG. 3 shows an example of RDFS entailment pattern.

An RDFS entailment pattern is displayed in FIG. 3 according to RDFS9 rule in W3C semantics. The rule says that if premises xxx rdfs:subClassOf yyy (i.e., xxx is subclass of yyy) and zzz rdf:type xxx (i.e., zzz is of type xxx) are true then the conclusion zzz rdf:type yyy (i.e., zzz is of type yyy) is true consequently. The RDFS9 may be expressed as a linear recursion Type(z,y)←Type(z,x),SubClassOf(x,y)

which reads as: the conclusion "Type(z,y)" (i.e., z is of type y) is true if the premises "Type(z,x)" (i.e., z is of type x), and "SubClassOf(x,y)" (i.e., class x is a subclass of y), are true.

In the notation, the coma ",", means logical AND. Such a rule is linear recursive as "Type" is in the head of the rule and in the body of the rule.

The "default attribute" example are now discussed.

Considering the following RDF dataset (Example A):

@prefix rdf: <http://www.w3.org/1999/02/22-rdf-syntax-ns #>.
@prefix rdfs: <http://www.w3.org/2000/01/rdf-schema #>.
@prefix ex: <http://www.example.org #>.
@prefix er: <https://www.3ds.com/er/>.
er:ProductAbstract a rdfs:Class.
er:VPMReference a rdfs:Class.
er:DomainSpecificRef a rdfs:Class.
er:VPMReference rdfs:sub ClassOf er:ProductAbstract.
er:DomainSpecificRef rd fs:subClassOf er:VPMReference.
ex:attr10 rdfs:domain er:ProductAbstract.
ex:attr10 rdfs:subPropertyOf er:Attribute.
ex:attr10 er:defaultValue "attr10DefaultValue".
ex:instance1 a er:DomainSpecificRef.
ex:instance1 ex:attr11 "specificValue4".

and as SPARQL query, using a query engine aware of the RDFS and "default attribute" logic rules, as

```
select ?attr ?value where {
    ex:instance1 ?attr ?value.
    ?attr rdfs:subPropertyOf er:Attribute.
}
```

The SPARQL query returns the following results:

<http://www.example.org #attr10>"attr10DefaultValue"
<http://www.example.org #attr11>"specificValue4"

as the value of attr10 is fetched on the ProductAbstract class. In addition to the RDFS rules, the implementation may use the following "default attribute" rule, with RDFS rules as a prerequisite:

er:Attribute. #a constant
DefaultAttr(A,v)←SubProperty(A, er:Attribute), DefaultValue(A,v).
A(i,v)←DefaultAttr(A,v), Domain(A,p), Type(i,P).

Therefore the application of the default attribute rule, matching A with http://www.example.org #attr10> and i with ex:instance1 gives the output "attr10DefaultValue" as v. In particular, the RDFS rules are also applied Type (as in RDF 1.1 Concepts and Abstract Syntax) The predicate DefaultAttr may be not materialized, in that case the rule may be rewritten as:

A(i,v)←SubProperty(A, er:Attribute), DefaultValue (A,v), Domain(A,p), Type(i,P).

The implementations may only consider linear recursive rules, i.e., the recursive predicate appears only once in the body of the rule. As known in the art, a linear recursive query for the relational calculus may use Datalog. Some known approaches to linear recursive query processing are now discussed.

Bottom-up approach may use a semi-naïve algorithm to derive new tuples from the ground tuples. This approach is simple to put in place in a query engine but does not minimize the derivation of tuples that are not necessary in answering a query. This introduces a cost in performances as unnecessary work is done. In this example the tuples in the database (i.e., the ground tuples) with the predicate "link" are:

link(a,b), link(b,c), link(c,c), link(c,d)

and the query is defined as:

r1 reachable(X,Y):-link(X,Y).
r2 reachable(X,Y):-reachable(X,Z), link(Z,Y).
query(Y):-reachable(b,Y).

Figure 5:
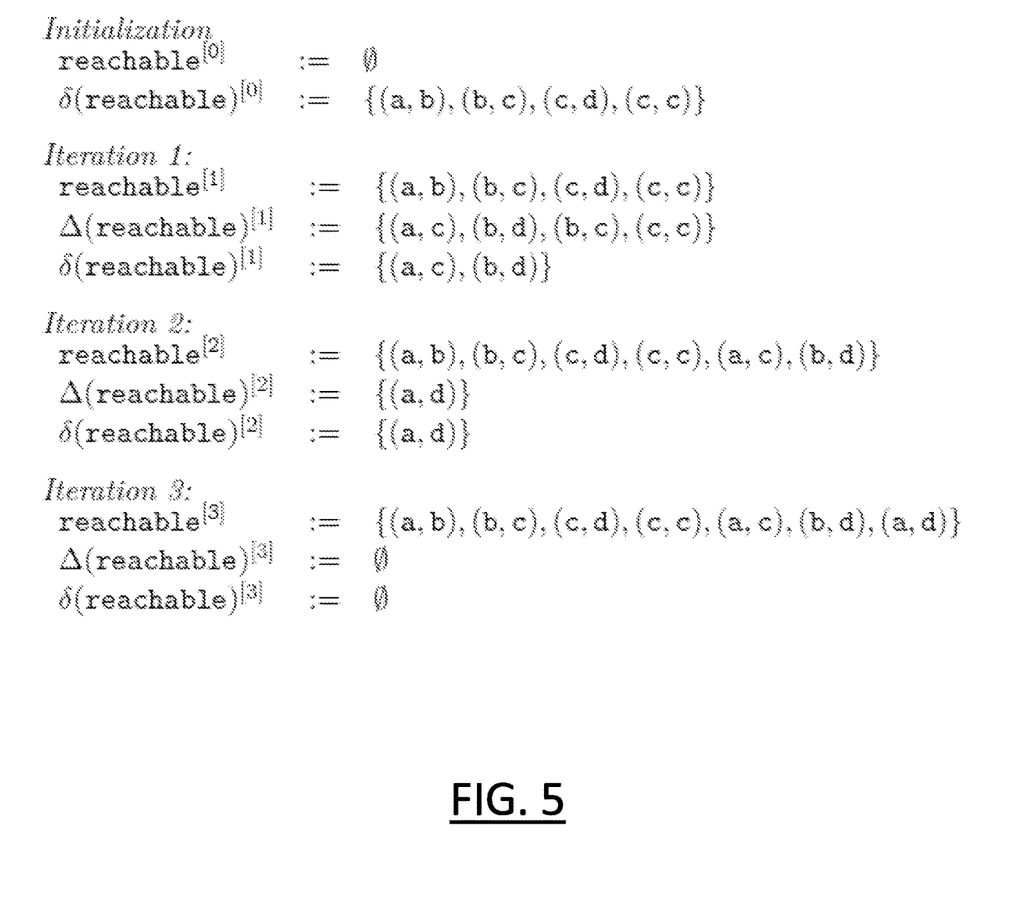
FIG. 5 shows an example of forward chaining technique.

The distinguished query predicate (i.e., head predicate, or output of interest) is the reachable table. The output is bounded to the constant b, indicating that the query is only interested in reachable tuples for node b. Restricting the output set has implications on the relative overheads of using bottom-up vs top-down evaluation techniques. The semi-naïve computation is done in three iterations as depicted in FIG. 5.

A bottom-up approach is easy to implement while it requires excessive computations and thereby has performance issue.

The Top-down approach aims to derive only those tuples relevant to the query, by starting the evaluation from the query itself, and pushing selection criteria (i.e., constants) from the query into rules. A top-down evaluation is a search for proof trees for the queries. A representative method of this approach is called Query/SubQuery (QSQ).

A top-down approach is efficient as it only derives the tuples relevant to the query, while it is complex and needs a dedicated query engine.

In the literature, the bottom-up approach is also called forward chaining, and the top-down approach is also called backward chaining. The terms forward/backward chaining are the ones generally used for RDF inference engines.

The standard linear recursive query processing methods have some drawbacks. In such a processing it is possible to use simple strategies like the bottom-up approach as discussed above but they are not efficient and derive too many tuples. On the other hand, the processing may use complex strategies like top-down approach that adds complexity to the query engine (or require a dedicated query engine). The added complexity of top-down approaches at query execution limits its usage and may make its use in interactive applications unworkable.

A common solution in SQL databases is then to use materialized views. A materialized view is a database object that contains the results of a query. Materialized views can be used to improve the performance of Datalog programs that perform frequent yet complex queries. If the EDBs (i.e., the extensional database predicates) corresponding to the source tables of the database, that a materialized view is computed from change, the materialized view needs to be maintained to reflect such changes. The efficient maintenance of materialized views thus become an important aspect of sustaining the performance benefits. However, materialized views in the prior art are specific to a tabular approach and there are no materialized views in representations of data as graphs.

Known RDF entailment engine implementations follow a similar pattern as the bottom-up and top-down approaches as discussed above. By "entailment engine" it is meant RDFS entailment inference engine. As discussed in RDF 1.1 Semantics, W3C Recommendation, the model theory for RDF and RDFS contains a number of entailments, which should be generated by an RDF inference engine. Existing systems generate these in several ways, but the most common approach employs a production rule system, which generates the required entailments by either forward chaining from asserted facts or backward chaining from queries that are presented to the system.

These approaches both have advantages and disadvantages: a purely forward chaining system applies the entailment rules in the model theory exhaustively to the asserted facts in order to generate the RDF closure (the deductive closure) of those facts. This eager evaluation of the deductive closure (performed by systems such as Sesame) has the effect of reducing the processing cost of evaluating queries. The entailments that returned by a query (in addition to any ground facts) are generated ahead of time, which may reduce the time taken to evaluate queries in some cases. This is an advantage for interactive applications where a fast response time is of paramount importance. The disadvantage of this approach is that the RDF closure may be many times the size of the asserted facts, and contain many entailments that match queries only rarely.

Conversely, a purely backward chaining system evaluates the entailments matched by a query at query processing time. This reduces the cost of storing the entailments since only those that are needed are generated at the cost of more expensive query processing. A backward chaining system that evaluates entailments might incur a time penalty that makes its use in interactive applications unworkable. Although the cost of repeated queries may be reduced by caching the generated entailments, there still exists a substantial cost at query time.

Typical query engines adopt a hybrid approach in which some entailment rules—typically those which generate fewer entailments—are evaluated using forward chaining rules when new facts are asserted. On the other hand, the entailments with a greater storage cost and a lower evaluation cost are evaluated as required at query time by a combination of backward chaining and query rewriting. Such a hybrid approach has some drawbacks. With a hybrid strategy combining forward chaining, backward chaining and query rewriting, a SPARQL query engine can evaluate RDFS rules quite efficiently. Yet it is a custom strategy dedicated to the RDFS rules that cannot be used as-is to address more generic rules such as the "default attribute" or "reachable" rules discussed above.

The examples of implementations of the present disclosure may be contemplated as inspired by the approach of materialized views used in a SQL query engine instead of adding extra complexity in the SPARQL query engine like for example with a Query/SubQuery strategy as known in the field, see the already cited document Green et al., "*Datalog and recursive query processing*", Now Publishers, 2013. However, materialized views are tabular objects and do not exist in the graph paradigm of SPARQL and RDF. The examples of implementations represent an RDF graph using vertical partitioning where each predicate is an adjacency matrix. Thereby, in the same spirit of a view for tabular data, the implementations define a virtual adjacency matrix that represents the adjacency matrix of the distinguished query predicate (i.e., output of interest).

For example, in the default attribute rule:
DefaultAttr(A,v)←SubProperty(A, er:Attribute), DefaultValue (A,v).
A(i,v)←DefaultAttr(A,v), Domain(A,p), Type(i,P).
in addition to the "concrete" adjacency matrices for sub-PropertyOf, DefaultValue, etc., there is a virtual adjacency matrix for A according to implementations. The virtual adjacency matrix acts as if all the triples are derived as in the semi-naïve approach and the content of the matrix is able to answer to the rules discussed above including RDFS rules, default attribute", and "reachable" rules.

The examples of implementations are now discussed for the example of the "default attribute" as discussed above.

Among the RDF triples each subject (S), predicate (P), and/or object (O) may be a variable of query. This means SPARQL queries needs to answer to eight different triple patterns possible in the SPARQL. Such eight triple patters include (S,P,O), (S,?P,O), (S,P,?O), (S,?P,?O), (?S,P,O), (?S,?P,O), (?S,P,?O), and (?S,?P,?O) in which variables are preceded in the pattern, by the symbol ?. Variables are the output of the SPARQL query, used as intermediary results (e.g., to process joins), or have no particular use but helping to form a query. In some examples SPARQL may build more complex queries (generically referred to as Basic Graph Patterns or BGPs) by joining sets of triple patterns.

In the examples of implementations, the query engine may use the eight patterns above as the basic building blocks. An RDF graph may be represented as a set of adjacency matrices, i.e., one adjacency matrix per predicate. Then, the answering to triple patterns may be seen as pattern matching on one or more adjacency matrix where each adjacency matrix represents a predicate. Given the "default attribute" rule defined as:
DefaultAttr(A,v)←SubProperty(A, er:Attribute), DefaultValue (A,v).
A(i,v)←DefaultAttr(A,v), Domain(A,p), Type(i,P)
there are the following predicates: DefaultAttr, SubProperty, DefaultValue, A, Domain and Type, where Domain stands for rdf:domain, Type stands for rdf:type and SubProperty stands for rdfs:subProperty. The distinguished query predicate, i.e., output of interest, is the predicate A in the rule. In Example A discussed above, the distinguished query predicate may be translated in RDF as ex:attr10.

Therefore, the example of implementations' objective is to be able to answer efficiently to the pattern:
ex:instance1 ex:attr10 ?v
with the output "attr10DefaultValue" (see Example A) thanks to the "default attribute" rule. The pattern ex:instance1 ex:attr10 ?v is the pattern (S,P,?O) applied on the adjacency matrix P=ex:attr10 with a subject S set (i.e., is bound) to ex:instance1.

The predicate ex:attr10 may have ground triples (i.e., non-inferred triples). According to the examples of implementations, the ground triples of the predicate may form an adjacency matrix of their own, the so-called "raw data matrix" (or R-Matrix). In comparison with a SQL database, the R-Matrices are part of the Extensional Database predicates (EDBs), i.e., the source tables of the database.

A SQL database requires a materialized view of the rules' result. Such rules' result is updated when the EDBs (of the SQL database) change. The examples of implementations define an "entailed data matrix" (or E-Matrix) as an adjacency matrix for the predicate ex:attr10 that is made of all the triples resulting of the application of the "default attribute" rule. The examples of implementations build an E-Matrix using forward chaining technique. The forward chaining technique, as known per se, applies the rules in the model theory exhaustively to the asserted facts (of the database) in order to generate the RDF closure (the deductive closure) of said facts.

Applying such a forward chaining technique to an example "default attribute" rule as:
DefaultAttr(A,v)←SubProperty(A, er:Attribute), DefaultValue(A,v),
A(i,v)←DefaultAttr(A,v), Domain(A,p), SubClassOf (i,P), means that the examples of implementations execute the following SPARQL query that is the translation of the rule above:

```
select ?i ?attr ?v
where {
?attr er:DefaultValue ?v .
?attr rdfs:subPropertyOf er:Attribute .
?attr rdfs:domain ?p .
?i rdfs:subClassOf ?p.
}
``` and materialize the results of the SPARQL query in the E-Matrix of each predicate ?p (and in particular with ?p==ex:attr10). The query discussed above is too costly to be used in query rewriting.

When the predicates of the above query, i.e., er:DefaultValue, rdfs:subPropertyOf, rdfs:domain and rdfs:subClassOf, which are EDBs in SQL are modified, the examples of implementations accordingly update E-Matrix as a materialized view in SQL. The examples of implementations perform such updates by a so-called "Update Processor".

Figure 4:
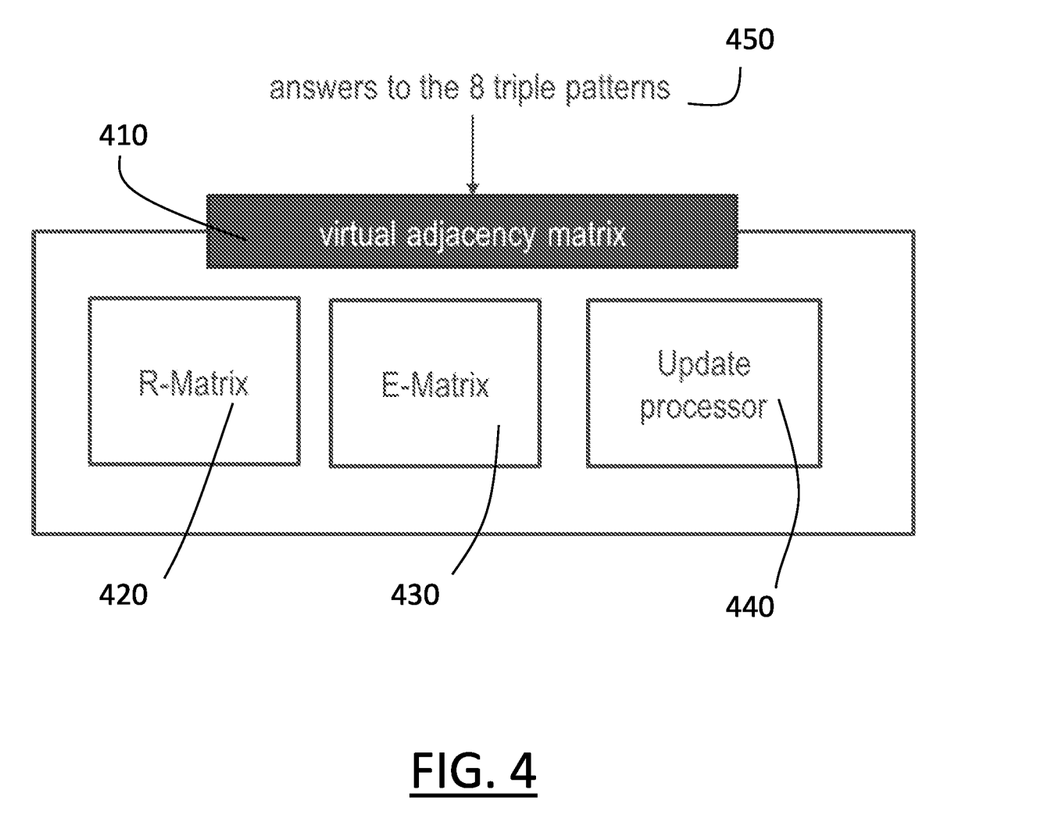
FIG. 4 shows a schematic representation of a virtual adjacency matrix.

The R-Matrix, E-Matrix, and Update Processor form together a virtual adjacency matrix configured to answer to the eight triple patterns of SPARQL according to the defined rule. A schematic representation of a virtual adjacency matrix is displayed in FIG. 4 in which virtual adjacency matrix 410 comprises R-Matrix 420, E-Matrix 430, and Update Processor 440 in order to answer the eight triple patterns of SPARQL 450.

The examples of implementations exploit the virtual adjacency matrix as if all the triples were derived as in the semi-naïve approach by a bottom-up approach as discussed above. In other words, taking the sample data as discussed above, the query:

```
select ?attr ?value where {
?attr rdfs:subPropertyOf er:Attribute.
ex:instance1 ?attr ?value.
}
``` returns the following results:
<http://www.example.org #attr10>"attr10DefaultValue", and
<http://www.example.org #attr11>"specificValue4".

The first result comes from the E-Matrix of ex:attr10, and the SPARQL query engine in the examples of implementations only asks the pattern ex:instance1 ex:attr10 ?value on the virtual adjacency matrix of the predicate ex:attr10.

Therefore, the SPARQL query engine in the examples of implementations is able to use the virtual adjacency matrix as a standard adjacency matrix to answer the query and without knowing the "default attribute" rule, thus with no added complexity. The examples of implementations are thus able to use custom logic rules to infer knowledge, in addition to the well-known RDFS rules.

The examples of implementations are advantageous as the inference is managed by the data structure, independently of the query engine, thereby avoid adding complexity to the query engine and simplify the updates of the E-Matrix. In other words, in order to update the E-Matrix there is no need to go through the query engine layer.

RDFS rules do involve recursion, however, the "default attribute" rule discussed above does not involve recursion. Restricting the disclosure to linear recursive rules (i.e., where the recursive predicate appears only once in the body of the rule) avoids high costs for updating the E-Matrix in the examples of implementations.

The invention claimed is:

1. A computer-implemented method for processing a logic rule in a graph database, the method comprising:
   obtaining a graph database having at least one graph, each graph of the database being represented in one or more adjacency matrices (R-Matrix), each adjacency matrix representing a group of tuples of the graph comprising a same predicate;
   obtaining the logic rule concluding to a head predicate;
   processing the logic rule on the graph database, thereby obtaining a group of inferred tuples computed by applying the logic rule;
   generating a virtual adjacency matrix having one of the one or more adjacency matrices (R-Matrix) and an entailed data matrix (E-Matrix), the virtual adjacency matrix representing the head predicate, wherein the entailed data matrix represents the group of inferred tuples computed by applying the logic rule;
   receiving, by the database, a query with the head predicate represented by the generated virtual adjacency matrix; and
   answering the received query by matching graph patterns according to the head predicate represented by the generated virtual adjacency matrix.

2. The computer-implemented method of claim 1, wherein the virtual adjacency matrix further comprises an update processor, the update processor being configured to update the entailed data matrix when the head predicate is modified.

3. The computer-implemented method of claim 1, wherein the logic rule includes a set of one or more logic rules each being, at most, a first order logic rule.

4. The computer-implemented method of claim 3, wherein the logic rule is expressed as a linear recursive query.

5. The computer-implemented method of claim 1, wherein the generation of the entailed data matrix includes a forward chaining technique.

6. The computer-implemented method of claim 1, wherein the group of tuples of the graph represented by a respective adjacency matrix are non-inferred tuples.

7. The computer-implemented method of claim 1, wherein the graph database is an RDF graph database, each tuple being:
   an RDF triple comprising a subject, a predicate, and an object; or
   an RDF quad comprising subject, a predicate, an object, and a graph name.

8. The computer-implemented method of claim 7, wherein the obtained logic rule is an RDFS rule.

9. The computer-implemented method of claim 7, wherein the obtained logic rule is a default attribute rule configured to return a default value for an object or a subject of at least one RDF tuple.

10. The computer-implemented method of claim 6, wherein the receiving a query by the database using the head predicate further comprises receiving a query by an SPARQL query engine.

11. The computer-implemented method of claim 10, further comprising:
    answering the received query by an SPARQL query engine.

12. A non-transitory computer readable storage medium having recorded thereon a computer program comprising instructions for performing a method for processing a logic rule in a graph database, the method comprising:

obtaining a graph database having at least one graph, each graph of the database being represented in one or more adjacency matrices (R-Matrix), each adjacency matrix representing a group of tuples of the graph comprising a same predicate;

obtaining the logic rule concluding to a head predicate;

processing the logic rule on the graph database, thereby obtaining a group of inferred tuples computed by applying the logic rule;

generating a virtual adjacency matrix having one of the one or more adjacency matrices (R-Matrix) and an entailed data matrix (E-Matrix), the virtual adjacency matrix representing the head predicate, wherein the entailed data matrix represents the group of inferred tuples computed by applying the logic rule;

receiving, by the database, a query with the head predicate represented by the generated virtual adjacency matrix; and answering the received query by matching graph patterns according to the head predicate represented by the generated virtual adjacency matrix.

13. The non-transitory computer readable storage medium of claim 12, wherein the virtual adjacency matrix further comprises an update processor, the update processor being configured to update the entailed data matrix when the head predicate is modified.

14. The non-transitory computer readable storage medium of claim 12, wherein the logic rule includes a set of one or more logic rules each being at most a first order logic rule.

15. The non-transitory computer readable storage medium of claim 12, wherein the logic rule is expressed as a linear recursive query.

16. The non-transitory computer readable storage medium of claim 12, wherein the generation of the entailed data matrix includes a forward chaining technique.

17. A system comprising:

a processor coupled to a memory, the memory having recorded thereon a computer program comprising instructions that, when executed by the processor, cause the processor to process a logic rule in a graph database by being configured to:

obtain a graph database having at least one graph, each graph of the database being represented in one or more adjacency matrices (R-Matrix), each adjacency matrix representing a group of tuples of the graph comprising a same predicate, process the logic rule on the graph database, thereby obtaining a group of inferred tuples computed by applying the logic rule, obtain the logic rule concluding to a head predicate, generate a virtual adjacency matrix having one of the one or more adjacency matrices (R-Matrix) and an entailed data matrix (E-Matrix), the virtual adjacency matrix representing the head predicate, wherein the entailed data matrix represents the group of inferred tuples computed by applying the logic rule, receive, by the database, a query with the head predicate represented by the generated virtual adjacency matrix, and answering the received query by matching graph patterns according to the head predicate represented by the generated virtual adjacency matrix.

18. The system of claim 17, wherein the virtual adjacency matrix further includes an update processor, the update processor being configured to update the entailed data matrix when the head predicate is modified.

19. The system of claim 17, wherein the logic rule includes a set of one or more logic rules each being at most a first order logic rule.

20. The system of claim 17, wherein the logic rule is expressed as a linear recursive query.

* * * * *